US012486650B2

(12) United States Patent
Wulfmeyer et al.

(10) Patent No.: US 12,486,650 B2
(45) Date of Patent: Dec. 2, 2025

(54) APPARATUS AND METHOD FOR OBTAINING FRESH WATER

(71) Applicant: Universitaet Hohenheim, Stuttgart (DE)

(72) Inventors: Volker Wulfmeyer, Stuttgart (DE); Oliver Branch, Leinfelden-Echterdingen (DE)

(73) Assignee: Universitaet Hohenheim, Stuttgart (DE)

( * ) Notice: Subject to any disclaimer, the term of this patent is extended or adjusted under 35 U.S.C. 154(b) by 613 days.

(21) Appl. No.: 17/987,008

(22) Filed: Nov. 15, 2022

(65) Prior Publication Data
US 2023/0074328 A1   Mar. 9, 2023

Related U.S. Application Data

(63) Continuation of application No. PCT/EP2021/062852, filed on May 14, 2021.

(30) Foreign Application Priority Data

May 15, 2020 (EP) .................................. 20174927

(51) Int. Cl.
*E03B 3/02* (2006.01)
*A01G 15/00* (2006.01)
(Continued)

(52) U.S. Cl.
CPC ............... *E03B 3/02* (2013.01); *A01G 15/00* (2013.01); *E02B 3/28* (2013.01); *H02S 40/40* (2014.12)

(58) Field of Classification Search
CPC ..... E03B 3/00; E03B 3/02; E03B 3/28; A01G 15/00; H02S 40/40
(Continued)

(56) References Cited

U.S. PATENT DOCUMENTS 2,268,320 A   12/1941   Brandt
3,601,312 A   8/1971   Feather
(Continued)

FOREIGN PATENT DOCUMENTS

AT   504575 A1   6/2008
CA   722429 A   11/1965
(Continued)

OTHER PUBLICATIONS

Branch, O. & Wulfmeyer, V.: "Deliberate enhancement of rainfall using desert plantations"; Proceedings of the National Academy of Sciences (PNAS), vol. 116, No. 38, pp. 18841-18847, Sep. 2019.
(Continued)

*Primary Examiner* — Steven J Ganey
(74) *Attorney, Agent, or Firm* — Harness, Dickey & Pierce, P.L.C.

(57) ABSTRACT

Apparatus for obtaining fresh water by artificially generating a precipitation. The apparatus comprises at least one darkening body that forms a darkening surface which has a width and/or length of at least 3 km and an albedo of less than 0.1. The apparatus further comprises at least one base frame which is arranged on a ground and configured to support the at least one darkening body so as to keep the at least one darkening body spaced apart from the ground in order to form a space between the at least one darkening body and the ground. Still further, the apparatus comprises a precipitation collection system which is arranged at least partially within the space and configured to collect the precipitation falling on the darkening surface.

17 Claims, 3 Drawing Sheets

(51) Int. Cl.
*E02B 3/28* (2006.01)
*H02S 40/40* (2014.01)

(58) Field of Classification Search
USPC ....... 239/2.1, 14.1; 136/246; 96/236; 95/126
See application file for complete search history.

(56) References Cited

U.S. PATENT DOCUMENTS

| | | | | |
|---|---|---|---|---|
| 6,828,499 | B2* | 12/2004 | Max | B01D 5/0042 |
| | | | | 136/246 |
| 2013/0227879 | A1* | 9/2013 | Lehky | E03B 3/28 |
| | | | | 96/236 |
| 2014/0150651 | A1* | 6/2014 | Velasco Valcke ... | B01D 5/0024 |
| | | | | 95/126 |
| 2019/0207552 | A1 | 7/2019 | Bodurow et al. | |

FOREIGN PATENT DOCUMENTS

| | | |
|---|---|---|
| DE | 4339576 A1 | 4/1994 |
| DE | 102005015514 A1 | 4/2006 |
| RU | 2071243 C1 | 1/1997 |
| WO | WO-2009135398 A1 | 11/2009 |
| WO | WO-2015150842 A1 | 10/2015 |
| WO | WO-2021229064 A1 | 11/2021 |

OTHER PUBLICATIONS

Extended European Search Report mailed Oct. 12, 2020, in corresponding European Application No. 20174927.2.

International Search Report and Written Opinion mailed Jul. 29, 2021, in corresponding International Application No. PCT/EP2021/062852.

Wulfmeyer, V. et al.: "The impact of plantations on weather and climate in coastal desert regions"; Journal of applied meteorology and climatologyy, vol. 53, pp. 1143-1169, May 2014.

International Search Report and Written Opinion mailed Nov. 15, 2022, in corresponding International Application No. PCT/EP2021/062852.

* cited by examiner

APPARATUS AND METHOD FOR OBTAINING FRESH WATER

CROSS-REFERENCE TO RELATED APPLICATIONS

This application is a continuation of International Patent Application No. PCT/EP2021/062852, filed on May 14, 2021 and designating the U.S., which international patent application has been published in English language and claims priority to European patent application EP 20 174 927.2, filed on May 15, 2020. The entire disclosures of these priority applications are incorporated herein by reference.

FIELD

This disclosure relates to an apparatus and method for obtaining fresh water by artificially generating a precipitation.

BACKGROUND

Strictly speaking, the precipitation in the sense of rain is not produced solely by the presented apparatus or method. Rather, the apparatus and method presented herein serve to intensify, induce and/or control cloud formation and the precipitation associated therewith.

The term "generating a precipitation" is therefore to be interpreted herein in a broad sense, so that it also includes the pure intensification, triggering and/or control of the formation of precipitation.

The apparatus and the method according to the disclosure are particularly intended for use in semi-arid, arid or extremely arid regions. This refers to areas or regions with dry or extremely dry climate in which the natural precipitation is lower than the possible evaporation in the long-term average. These are mostly deserts, which is why arid climate is often also referred to as desert climate.

Fresh water production in such areas is a long-term problem. This problem tends to be exacerbated by the ongoing global climate change.

This immense problem could be solved by an apparatus and method for artificially generating precipitation. Just a few approaches for such methods are generally known.

However, a lot of these approaches are hard to implement in practice or have ultimately proven to be not workable. For example, cloud seeding was pursued as one possible approach. However, no scientifically proven effect on the formation of clouds or precipitation in arid regions has been demonstrated yet.

Approaches such as those presented in DE 10 2005 015 514 A1, DE 43 39 576 A1 and U.S. Pat. No. 3,601,312 A also appear to be more theoretical, but by no means scientific, and are therefore unlikely to be effective in practice.

Thus, seawater desalination remains one of the few practically relevant options for fresh water production in arid areas. Seawater desalination techniques are well established all over the world. Nevertheless, seawater desalination is still very expensive and energy-intensive.

SUMMARY

It is object to provide an apparatus and a method for obtaining fresh water by an artificial generation (intensification, triggering and/or control) of precipitation. This apparatus and method shall be functional in practice and realizable at a reasonable cost.

According to a first aspect, an apparatus is provided, comprising:
at least one darkening body that forms a darkening surface having a width and/or a length of at least 3 kilometers (km) and an albedo of less than 0.1, wherein the at least one darkening body comprises only one such darkening body forming the darkening surface or a plurality of such darkening bodies that are arranged side by side to one another and together form the darkening surface;
at least one base frame that is arranged on a ground and configured to support the at least one darkening body so as to keep the at least one darkening body spaced apart from the ground in order to form a space between the at least one darkening body and the ground, and
a precipitation collection system that is arranged at least partially within the space and configured to collect and store the precipitation falling on the darkening surface, wherein the precipitation collection system comprises at least one water tank and at least one precipitation collection channel that is fluidly connected to the at least one water tank.

According to a second aspect, a use of an apparatus on a ground in a semi-arid, arid or extremely arid region to obtain fresh water by artificially generating a precipitation is provided, wherein the apparatus comprises: at least one darkening body that forms a darkening surface having a width and/or a length of at least 3 km and an albedo of less than 0.1, wherein the at least one darkening body comprises only one such darkening body forming the darkening surface or a plurality of such darkening bodies that are arranged side by side to one another and together form the darkening surface; at least one base frame that is arranged on the ground and configured to support the at least one darkening body so as to keep the at least one darkening body spaced apart from the ground in order to form a space between the at least one darkening body and the ground; and a precipitation collection system that is arranged at least partially within the space and configured to collect and store the precipitation falling on the darkening surface, wherein the precipitation collection system comprises at least one water tank and at least one precipitation collection channel that is fluidly connected to the at least one water tank.

According to a third aspect, a method is provided, comprising:
providing at least one darkening body;
arranging the at least one darkening body on a ground in a semi-arid, arid or extremely arid region so as to form a darkening surface which has a width and/or length of at least 3 km and an albedo of less than 0.1, wherein the at least one darkening body comprises only one such darkening body forming the darkening surface or a plurality of such darkening bodies which are arranged side by side to one another and together form the darkening surface,
supporting the at least one darkening body using at least one base frame such that the at least one darkening body is kept spaced apart from the ground in order to form a space between the at least one darkening body and the ground and such that a local heat low is generated that destabilizes air mass above the darkening surface and generates a change in air flow over the darkening surface, which change in air flow leads to a convergence zone above or on a wind-remote side of the darkening surface and, ultimately, to the artificial generation of precipitation which falls at least partially on the darkening surface, and collecting and storing the precipitation using a precipitation collection system that is arranged at least partially within the space, wherein the precipitation collection system comprises at least one water tank and at least one precipitation collection channel that is fluidly connected to the at least one water tank.

The presented apparatus comprises a single darkening body or a plurality of darkening bodies arranged side by side, wherein the at least one darkening body forms a darkening surface having a very low albedo. The at least one darkening body forms a very large surface that strongly darkens the typically light ground surface in desert areas. This darkening surface is at least three kilometers wide and/or long. In other words, at least one of the three dimensions of the darkening surface is equal to or larger than three kilometers.

This large darkening surface absorbs the energy of the sun and heats up in the process. In other words, the one or more darkening bodies arranged next to each other are strongly heated up by the sun.

Due to the at least one base frame that is configured to support the at least one darkening body, the dark area generated by the at least one darkening body is kept at a distance from the ground and is thus decoupled from the ground. The at least one darkening body does therefore not rest directly on the ground. This further increases the above-mentioned heating effect, as the heat flow from the at least one darkening body towards the ground is minimized.

The installation of the herein-presented apparatus in a desert area causes a macroscopic change in the roughness of the desert surface, i.e. a modified surface friction. The heating and the modified surface friction cause, on the one hand, a heat low which destabilizes the air mass above the apparatus and, on the other hand, a change in the air flow over the darkening surface which leads to a convergence zone above the apparatus or on its lee side, i.e. the downwind side of the apparatus.

This combination of lift and convergence creates a vertical movement of air that can overcome the atmospheric barriers and lead to a high-reaching convection (up to 16 km altitude). This leads to a cloud formation or at least to an increase in cloud formation. If the vertical extension of the cloud is high enough, a significant amount of precipitation is induced. This causing and amplification of precipitation is at least 50 times larger than the effect postulated by cloud seeding, which, however, as mentioned at the outset, has not yet been proven at all.

The fact that the above-mentioned meteorological effects may indeed be caused by an extensive darkening of a desert surface has already been scientifically proven by the inventors and explained in detail in the following publications: Wulfmeyer, V. et al.: "The impact of plantations on weather and climate in coastal desert regions", Journal of applied meteorology and climatology, vol. 53, pp. 1143-1169, May 2014 and Branch, O. & Wulfmeyer, V.: "Deliberate enhancement of rainfall using desert plantations", Proceedings of the National Academy of Sciences (PNAS), vol. 116, no. 38, pp. 18841-18847, September 2019. In these publications, the above-mentioned effect was not achieved by an apparatus, but was investigated using natural plantations in Oman and the Sonora Desert in Mexico.

Computer simulations show that in suitable areas, for example in the United Arab Emirates or Oman, the apparatus according to the present disclosure may be used to increase the amount of precipitation to an amount of up to 150,000-200,000 cubic meters ($m^3$) of water per event. Further analyses of the meteorological conditions show that about 5-10 precipitation events of the aforementioned type may be expected during summer in these areas with the apparatus according to the present disclosure.

The herein-presented apparatus furthermore has the advantage that the at least one base frame, which supports the at least one darkening body, creates a space between the support surface (the ground) and the at least one darkening body. This space does not only lead to the above-mentioned advantage of a reduced heat conduction towards the ground, but also allows a precipitation collection system to be arranged below the at least one darkening body. With the aid of this precipitation collection system, the precipitation falling over the darkening surface can be effectively collected and stored. Since the precipitation collection system is arranged in the darkened area below the at least one darkening body, it does not heat up too much, especially not too much as compared to the case if it were arranged in the blazing desert sun. The evaporation of the water collected in the precipitation collection system may thus be significantly reduced.

In this way, it is possible to generate or sustainably increase the precipitation and to collect and store the fresh water obtained from the precipitation. This is achieved using a regional influence on the meteorological conditions caused by the apparatus according to the disclosure, wherein deformations of the wind field and a large scale lift are produced, which break through the subsidence of the atmosphere and produce high-reaching clouds and precipitation.

The present disclosure is therefore based on actively influencing the dynamics and thermodynamics of the atmosphere. In contrast to the method of cloud seeding mentioned at the outset, the apparatus and method according to the disclosure do not concentrate on clouds that are already there, but on the generation of these clouds themselves.

Nevertheless, it is generally possible and may be even advantageous to combine the herein-presented method with the already known method of cloud seeding.

According to a refinement, the albedo of the darkening surface for visible light is less than 0.05, preferably less than 0.03.

The albedo is a measure of the reflectivity of diffusely reflecting, i.e. not self-illuminating surfaces. It is a measure of the diffuse reflection of solar radiation out of the total solar radiation and measured on a scale from 0, corresponding to a black body that absorbs all incident radiation, to 1, corresponding to a body that reflects all incident radiation. If the term "albedo" is used herein, the geometric albedo (not the spherical albedo) is preferably meant. Further preferably, the term "albedo" may herein be understood as mean albedo, e.g. as the mean or average value of the albedo over/across the whole darkening surface. Thus, instead of the term "albedo", the term "geometric mean albedo for solar irradiation" may be used herein as well.

Hence, the lower the albedo of the at least one darkening body, the stronger the above-mentioned heating effect, which emanates from the apparatus, and the more effective the influence on the dynamics and thermodynamics of the atmosphere, which leads to the artificial generation or amplification of the precipitation.

According to a further refinement, the darkening surface has a size of at least 5 kilometers squared ($km^2$), more preferably of at least 9 $km^2$, most preferably of at least 25 $km^2$.

Simulations have exemplarily shown that it is advantageous if at least the length or the width of the darkening surface is at least 5 km. As an absolute minimum, the lower limit of 3 km width and/or length applies. A quite reasonable size of the darkening surface would be e.g. a length of 5-10 km and a width of 1-2 km. However, the darkening surface does not necessarily have to be rectangular. The darkening surface may also be of any other shape without leaving the spirit and scope of the present disclosure.

If the herein-presented apparatus comprises not only a single, but a plurality of darkening bodies which are arranged side by side, gaps between the individual darkening bodies may exist without leaving the spirit and scope of the present disclosure. Although this is preferred, the individual darkening bodies do not necessarily have to be flush with each other. The term "arranged side by side" is herein to be understood in a broad sense. There may be gaps or distances of several meters or more between the individual darkening bodies. Nevertheless, the smaller the distance between the individual darkening bodies, the greater the darkening effect. The best darkening effect is achieved if only a single, very large darkening body is used.

According to a further refinement, the precipitation collection system comprises at least one water tank and at least one precipitation collection channel that is fluidly connected to the at least one water tank.

The precipitation collection channel and the water tank are preferably arranged below the at least one darkening body, i.e. in the space created by the at least one base frame. Preferably, the precipitation collection channel is arranged in such a way that the precipitation falling on the apparatus automatically reaches the collection channel and from there flows simply driven by gravity into the at least one water tank, i.e. without the need of an actuator (e.g. a pump). However, the shape and arrangement of the at least one precipitation collection channel and the water tank are freely selectable.

According to a further refinement, at least one opening is provided in the at least one darkening body, which opening opens into the at least one precipitation collection channel.

This opening may be of any shape. Due to the overall size of the herein-presented apparatus, the apparatus preferably comprises a plurality of such openings. For example, one or more slits may be provided in the at least one darkening body, such that the precipitation may directly enter the precipitation collection channel located below the one or more slits. It is also possible to provide smaller gaps between the individual darkening bodies and to arrange the at least one precipitation collection channel in or below these gaps.

According to a further refinement, the at least one darkening body is oriented horizontally or inclined at an angle of less than or equal to 5 degrees (°) with respect to the horizontal.

The top face of the at least one darkening body, i.e. the side facing away from the base frame, is preferably designed as a flat surface. A horizontal arrangement of this top face has particularly the advantage of a relatively low overall height of the apparatus. On the other hand, a slight inclination of this top face in relation to the horizontal is advantageous in that the precipitation falling on it drains off more easily in a predetermined direction. The apparatus is thereby cleaned as well, which is a further significant advantage, as the albedo remains low when the surface is kept clean.

If the at least one darkening body comprises a plurality of darkening bodies, the individual darkening bodies may be aligned in such a way that all of their top faces lie in the same plane and are inclined with respect to the horizontal or not. However, it is also possible that the individual darkening bodies are each inclined with their respective top face at the same angle with respect to the horizontal, so that the top faces of the individual darkening bodies are arranged parallel to one another. It is also conceivable that the individual darkening bodies are inclined at different angles in relation to the horizontal.

According to a further refinement, the at least one darkening body comprises a black foil. Preferably, this is a thermal foil with which the top face of the at least one darkening body is covered. The albedo of this black foil is preferably within the above-mentioned range (less than 0.1, preferably less than 0.05, most preferably less than 0.03).

According to a further refinement, the one darkening body comprises at least one photovoltaic panel.

Such photovoltaic panels have a very low albedo as well. Photovoltaic panels may therefore be arranged on top of the darkening bodies instead of the above-mentioned black film. However, it is also possible to use both darkening bodies with a black film and darkening bodies with a photovoltaic panel. This is particularly advantageous from a cost perspective, since a large-scale use of darkening devices with photovoltaic panels would be very cost-intensive.

The use of darkening devices with a photovoltaic panel has the advantage that, in addition to the production of fresh water, electricity may be generated at the same time with the apparatus according to the disclosure. This is particularly advantageous if the at least one darkening body comprises at least one heating element. In such a case, the heating element may be operated using the energy produced by the at least one photovoltaic panel.

According to a further refinement, the at least one heating element is coupled to the at least one photovoltaic panel. The heating effect emanating from the apparatus can thus be additionally enhanced without requiring an external energy supply (except solar energy).

According to a further refinement, the apparatus comprises a weather forecast module and a control unit, wherein the weather forecast module is configured to determine a meteorological forecast based on a plurality of meteorological parameters, and wherein the control unit is configured to control the at least one heating element based on the meteorological forecast.

The effects to be achieved with the apparatus according to the present disclosure, namely the generation of an artificial heat low as well as the generation or intensification of precipitation, can only be generated on specific days per year. However, scientific investigations by the inventors have shown that it is possible to predict weather situations in which these effects can be achieved based on meteorological parameters. In the above-mentioned publication of the two inventors, a corresponding index is presented for this purpose, wherein the index allows predicting the increase in precipitation produced by the apparatus according to the disclosure, so that it is technically possible to prepare for the precipitation event and to optimize the collection of precipitation (see Branch, O. & Wulfmeyer, V.: "Deliberate enhancement of rainfall using desert plantations", PNAS, vol. 116, no. 38 pp. 18841-18847, September 2019). This index may be used within the aforementioned weather forecast module to determine a corresponding meteorological forecast. The aforementioned control unit may be configured to control the heating element and the photovoltaic panel depending on the meteorological forecast so that the at least one heating element and the photovoltaic panel are only turned on if the probability of a precipitation generation with the apparatus according to the disclosure can be expected based on the current weather situation.

The meteorological parameters necessary for the determination of the meteorological forecast may be obtained either via an appropriate data receiving unit from a data network, for example the Internet, or via broadcasting. Alternatively, it is possible that the weather forecast module comprises several sensors that are configured to detect the corresponding meteorological parameters. This provides the advantage of a self-sustaining, closed system.

It goes without saying that the features mentioned above and those yet to be explained may be used not only in the combination indicated in each case, but also in other combinations or in an isolated manner, without leaving the spirit and scope of the present disclosure.

DESCRIPTION OF PREFERRED EMBODIMENTS

Figure 1:
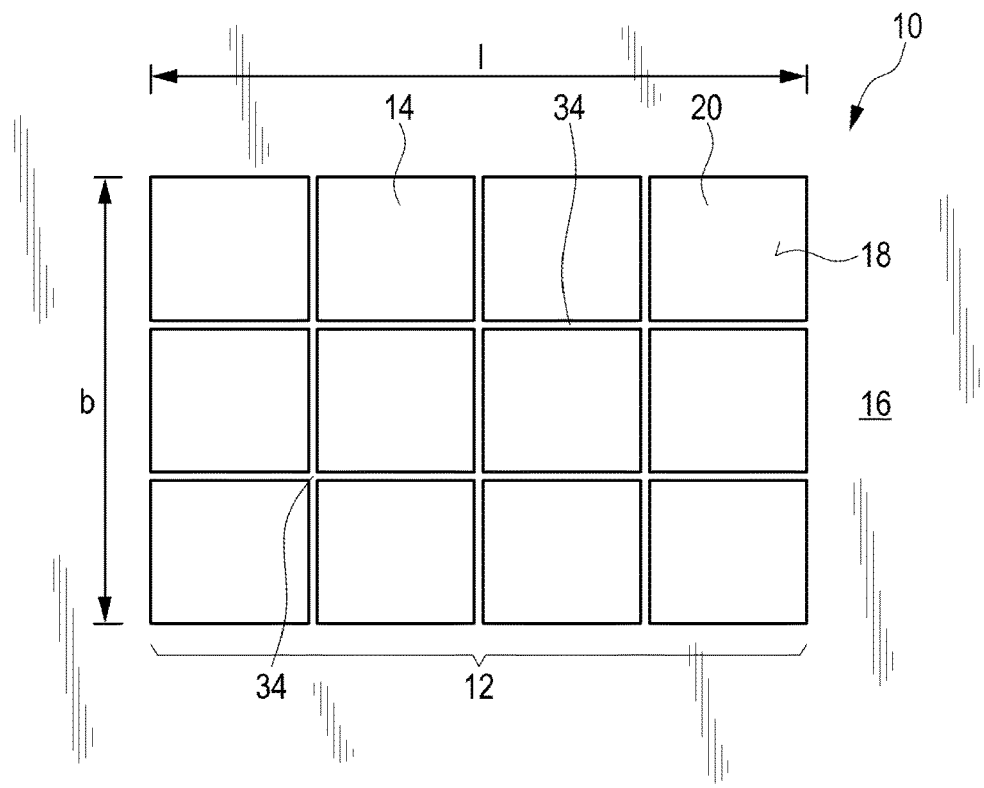
FIG. 1 shows a schematic plan view from above of a first embodiment of an apparatus according to the present disclosure.

FIG. 1 shows a first embodiment of the apparatus in a schematic plan view from above. The apparatus is denoted therein in its entirety with the reference numeral 10.

The apparatus 10, which may also be described as a cloud and precipitation reactor/generator, has a large darkening surface 12, which is formed by a plurality of large darkening bodies 14. FIG. 1 schematically shows twelve such darkening bodies 14, which are arranged next to one another in a kind of matrix arrangement and together form a large rectangular darkening surface 12. In the embodiment shown in FIG. 1, each darkening body 14 is also rectangular or square.

The shape and type of arrangement of the darkening bodies 14, as shown in FIG. 1, is only one of many possible examples. Instead of a rectangular design, the individual darkening bodies 14 may also be e.g. round, triangular or polygonal. Also the shape of the darkening surface 12 that is jointly formed by the darkening bodies 14 may vary. Likewise, it is possible that the apparatus 10 comprises only a single darkening body 14 which has a very large surface area and thus forms the darkening surface 12 alone.

The at least one darkening body 14 is arranged on a ground that forms a darkening surface 12.

Irrespective of the design of the darkening bodies 14 and irrespective of the shape of the darkening surface 12, the darkening surface 12 covers an area of several km². Preferably the darkening surface 12 has a size of at least 5 km², most preferably of at least 10 km². It is also preferred that at least one dimension, i.e. the length l and/or the width b, is at least 3 km, most preferably at least 5 km.

The darkening surface 12 is used to darken the support surface 16 on which the apparatus 10 is placed. Since the apparatus 10 is intended to be used particularly in arid regions, the support surface 16 is preferably desert ground, which is darkened by means of the darkening bodies 14.

The individual darkening bodies 14 are according to the first embodiment shown in FIG. 1 coated with a dark, preferably black, thermal foil 20. The thermal foil 20 has a very low albedo which is preferably less than 0.1 for visible light. The albedo of the thermal foil 20 should be selected such that the albedo of the whole darkening surface 12 formed by the darkening bodies 14 is less than 0.1 for visible light, preferably less than 0.05, and most preferably less than 0.03.

The thermal foil 20 is arranged on the top face 18 of the darkening bodies 14 which faces away from the support surface 16. Accordingly, the top face 18 is directed towards the sky.

Figure 3:
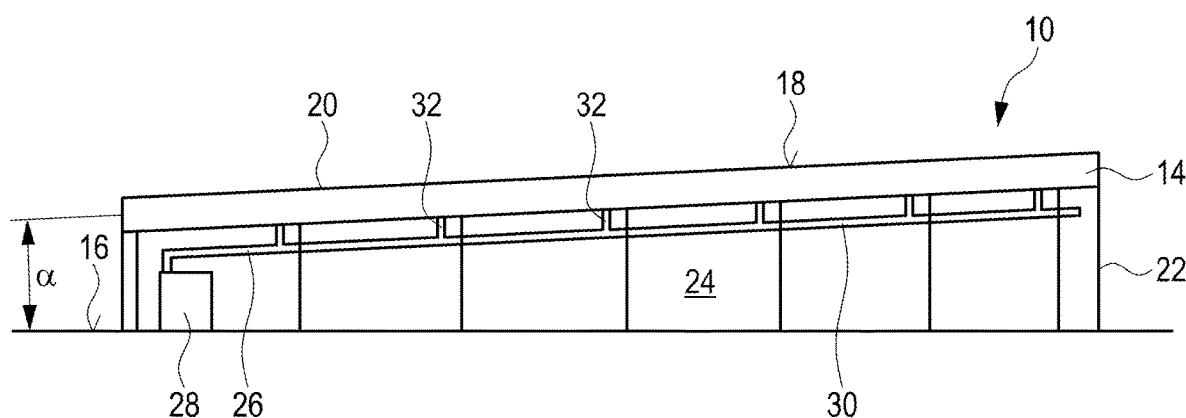
FIG. 3 shows a schematic sectional view of a part of the first embodiment shown in FIG. 1.

The darkening bodies 14 are preferably substantially plate-shaped and are supported by a base frame 22 (see FIG. 3). This base frame 22 is firmly connected to the ground, i.e. the support surface 16, by means of a suitable foundation. This may be realized, for example, by appropriate anchorages or by setting the base frame 22 in concrete.

The base frame 22 helps to keep the individual darkening bodies 14 at a distance from the support surface 16. The darkening bodies 14 are thus thermally decoupled from the ground. This creates a space 24 between the support surface 16 and the individual darkening bodies 14. This space 24 provides the advantage that the heat flow between the darkening bodies 14 and the support surface 16 is minimized. On the other hand, a precipitation collection system 26 can be arranged in the space 24.

The precipitation collection system 26 is preferably arranged at least partially in the space 24. However, parts of this precipitation collection system 26 may also be arranged outside of the space 24, for example sideways of the darkening surface 12. An arrangement of the precipitation collector 26 below the darkening bodies 14 provides the advantage that it ensures an optimal collection of the precipitation falling onto the apparatus 10. In addition, the precipitation collection system 26 is protected and housed in a darkened area. It does not heat up too much, so that the collected precipitation hardly evaporates.

According to the embodiment shown in FIG. 3, the precipitation collection system 26 comprises a water tank 28 and a precipitation collection channel 30 which opens into the water tank 28. The precipitation collection channel 30 comprises several sub-channels 32, via which the water reaches the precipitation collection channel 30, so that it may flow from there into the water tank 28. The sub-channels 32 are arranged below a plurality of openings 34 that are provided in the darkening surface 12. These openings 34 may, for example, be gaps provided between the individual darkening bodies 14. The precipitation falling over the apparatus 10 can seep down through these gaps 34 and reach the water tank 28 via the precipitation collection channel 30. It is also possible to provide individual openings in the darkening bodies 14 themselves and then let the sub-channels 32 open into these openings or let the sub-channels 32 start in these openings.

The darkening body 14 is preferably inclined with respect to the horizontal, as this is indicated by the angle $\alpha$ in FIG. 3. This inclination simplifies the drainage of water into the water tank 28. Depending on the embodiment, this inclination has a maximum angle $\alpha$ of 5°. Otherwise, the height of the apparatus 10 at the right end shown in FIG. 3 would become too large. This would be particularly the case if the entire darkening surface 12 was formed by a single darkening body 14.

Figure 4A:
FIG. 4A-4C show schematic sketches illustrating various exemplary arrangements of the darkening bodies of the apparatus.
Figure 4B:
Figure 4C:

FIG. 4A-4C show possible arrangements of the individual darkening bodies 14. However, the embodiments shown there are only three of a multitude of possible arrangements. For example, the darkening bodies 14 may each be inclined at the same angle with respect to the horizontal, so that their top faces 18 are aligned parallel to each other (see FIG. 4A). It is also possible to align the darkening bodies 14 in opposite directions or at different angles with respect to the horizontal (see FIG. 4B). Another possibility is to align the darkening bodies 14 horizontally (see FIG. 4C). Even in such a case, the water drain may be handled by arranging at least parts of the precipitation collection channel 30 below the darkening bodies 14 at an angle with respect to the horizontal.

Figure 6:
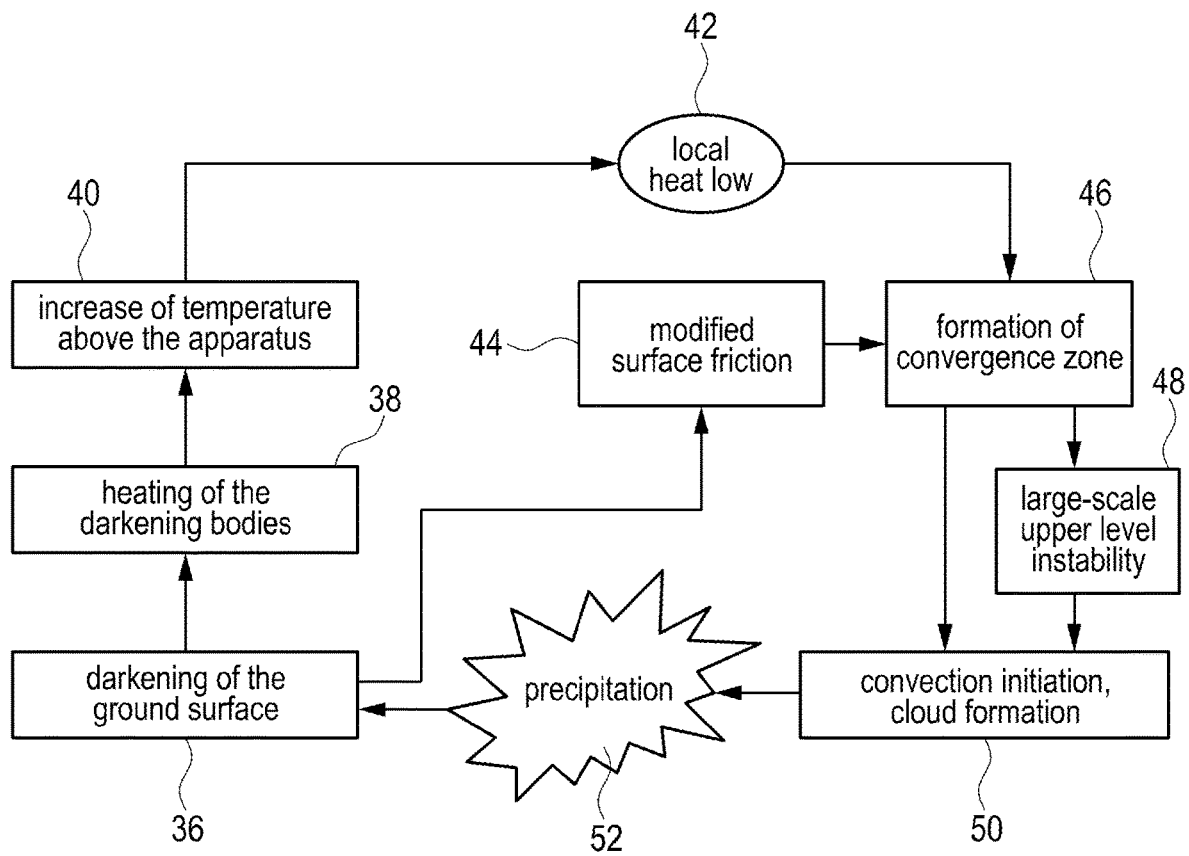
FIG. 6 shows a schematic flow chart to illustrate an embodiment of a method according to the present disclosure.

FIG. 6 schematically illustrates an embodiment of the method and, thus, a possible use of the apparatus 10. The darkening bodies 14 provide passive darkening of the support surface 16 (see reference numeral 36). The darkening surface 12 or the darkening bodies 14 absorb the energy of the sun and heat up (see reference numeral 38). Passive darkening of support surface 16 means that no additional energy input is required in darkening bodies 14. The additional energy required to heat the darkening surface 12 is supplied solely by the sun. The air mass above the apparatus 10 heats up as a result (see reference numeral 40). This creates a local heat low in the area above apparatus 10 (see reference numeral 42). At the same time, the apparatus 10 changes the macroscopic roughness/friction of the support surface 16, which is modified by the fixture 10 (see reference numeral 44). Due to the heating and modified surface friction, a deformation of the wind field and a large scale lift are created, which leads to the formation of a convergence zone above or on the lee side of the apparatus 10 (see reference numeral 46). More precisely, the heat low destabilizes the air mass above the apparatus 10 and, on the other hand, the heating and the modified surface friction change the air flow above the apparatus 10 so that the mentioned convergence zone is formed. This combination of lift and convergence creates a vertical movement of air which may break through the atmospheric barriers and lead to a high-reaching convection (see reference signs 48, 50). If the vertical extent of the cloud is high enough, a significant amount of precipitation is released (see reference numeral 52).

The apparatus 10 thus influences the dynamics and thermodynamics of the atmosphere in the above-mentioned manner over a large area. The apparatus 10 generates deformations of the wind field and lift areas, which break through the atmospheric subsidence and produce high-reaching clouds and finally precipitation. This precipitation can be collected and stored in the aforementioned manner by means of the precipitation collection system 26.

Figure 2:
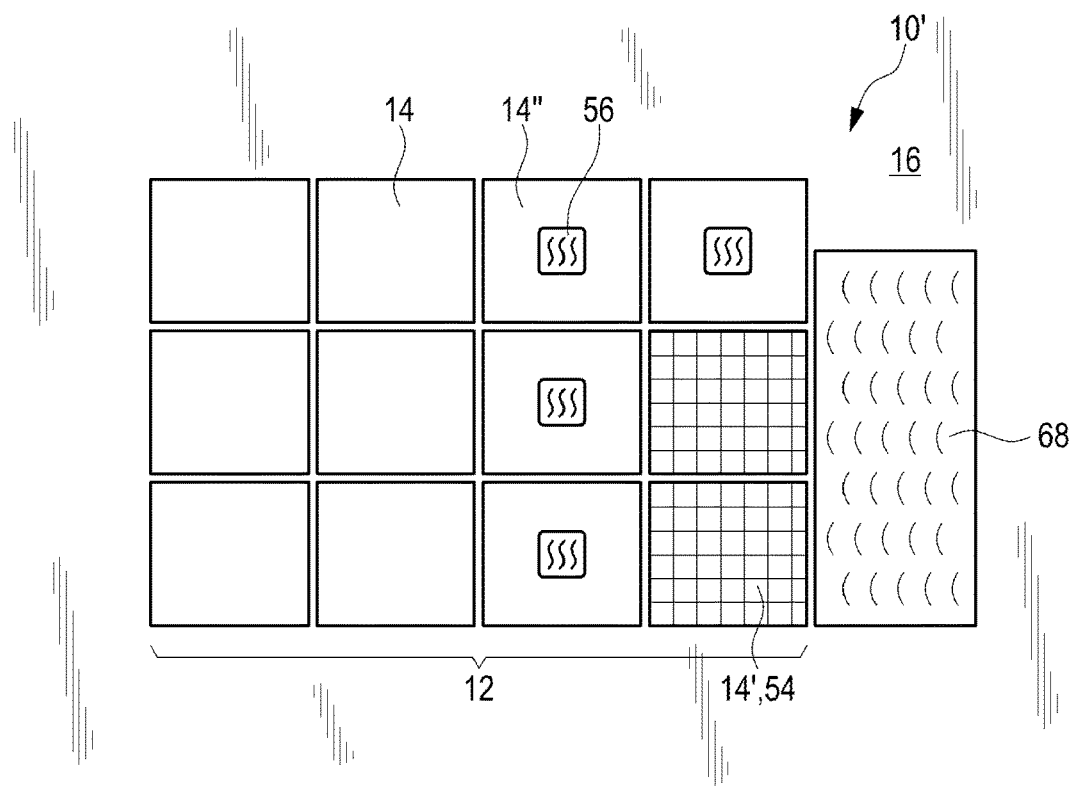
FIG. 2 shows a schematic plan view from above of a second embodiment of the apparatus.
Figure 5:
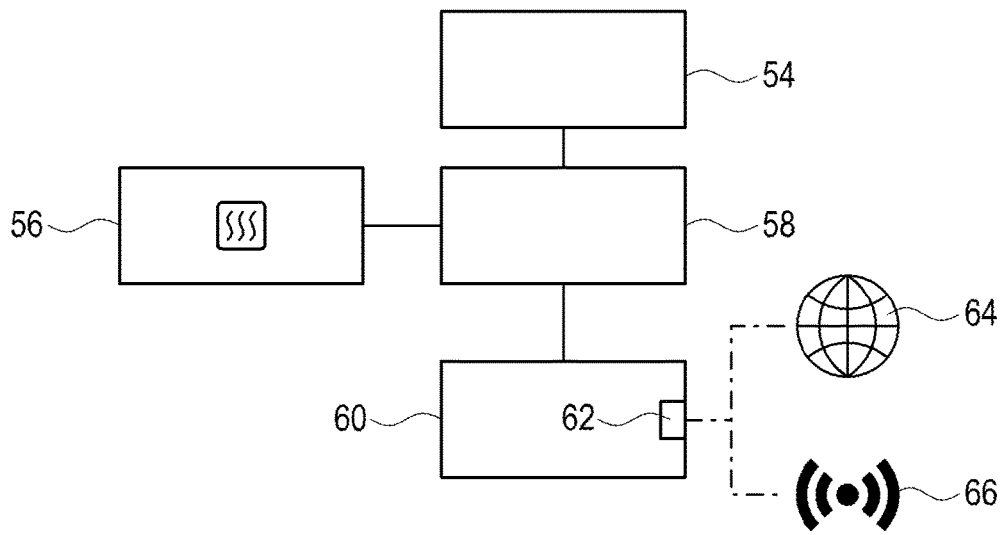
FIG. 5 shows a schematic block diagram illustrating the interaction of several components of the apparatus according to an embodiment.

The above-mentioned effects may be further enhanced in further embodiments. FIGS. 2 and 5 show a second embodiment. In addition to the darkening bodies 14 coated with a thermal dark foil 20, the apparatus 10' there comprises darkening bodies 14' comprising a photovoltaic panel 54. Furthermore, the apparatus 10' comprises darkening bodies 14" which are provided with a heating element 56. The photovoltaic panels 54 may, in addition to their darkening function, generate electricity, which is used, for example, to operate the heating elements 56. In this way, the darkening bodies 14" may be heated even further to enhance the above-mentioned effects.

The apparatus 10' according to this embodiment further comprises a control unit 58 and a weather forecast module 60. The weather forecast module 60 is configured to determine a meteorological forecast on the basis of several meteorological parameters, in order to be able to determine on which days or at what times the meteorological conditions are actually present to trigger the method for precipitation generation shown schematically in FIG. 6. The inventors have already developed a corresponding index for such a weather forecast. This index is described in the publication mentioned at the outset (Branch, O. & Wulfmeyer, V.: "Deliberate enhancement of rainfall using desert plantations", Proceedings of the National Academy of Sciences (PNAS), vol. 116, no. 38, pp. 18841-18847, September 2019). The index for predicting the corresponding weather events uses several meteorological parameters, such as temperature and pressure. In order to receive these meteorological parameters, the weather forecast module 60 comprises a data receiving unit 62 which receives these parameters either from a data network 64 (e.g. Internet) or from sensors 66 located at or near the apparatus 10'. In other words, the meteorological parameters necessary for the calculation of the forecast may either be provided externally to the apparatus 10' by weather services or measured by the apparatus 10' itself using suitable sensors 66.

In addition, the apparatus 10' may also be combined with the construction of a plantation 68, which is placed next to or in the vicinity of the darkening surface 12 (see FIG. 2). Of course, the plantation 68 may also be an existing plantation, next to which the apparatus 10' is built.

The installation of the apparatus 10 or 10' next to a plantation 68 provides the advantage that due to the plantation 68 a further darkening as compared to the regular desert ground 16' is created. Furthermore, the precipitation produced by the apparatus 10, 10' may be used for irrigating the plantation 68.

The herein-presented apparatus may also be combined with orographic surfaces or elevated surfaces (hills, mountains, etc.), which are either artificially created or exist naturally. This could further increase the formation of precipitation.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An apparatus for obtaining fresh water by artificially generating a precipitation, wherein the apparatus comprises:
   at least one darkening body that forms a darkening surface having a width and/or a length of at least 3 km and an albedo of less than 0.1, wherein the at least one darkening body comprises only one such darkening body forming the darkening surface or a plurality of such darkening bodies that are arranged side by side to one another and together form the darkening surface;

at least one base frame that is arranged on a ground and configured to support the at least one darkening body so as to keep the at least one darkening body spaced apart from the ground in order to form a space between the at least one darkening body and the ground; and a precipitation collection system that is arranged at least partially within the space and configured to collect and store the precipitation falling on the darkening surface, wherein the precipitation collection system comprises at least one water tank and at least one precipitation collection channel that is fluidly connected to the at least one water tank.

2. The apparatus according to claim 1, wherein the albedo of the darkening surface for visible light is less than 0.05.

3. The apparatus according to claim 1, wherein the albedo of the darkening surface for visible light is less than 0.03.

4. The apparatus according to claim 1, wherein the darkening surface has a size of at least 5 km².

5. The apparatus according to claim 1, wherein the darkening surface has a size of at least 10 km².

6. The apparatus according to claim 1, wherein at least one opening is provided in the at least one darkening body, which opening opens into the at least one precipitation collection channel.

7. The apparatus according to claim 1, wherein the at least one darkening body is oriented horizontally or inclined at an angle of less than or equal to 5° with respect to horizontal.

8. The apparatus according to claim 1, wherein the at least one darkening body comprises a black foil.

9. The apparatus according to claim 1, wherein the at least one darkening body comprises at least one photovoltaic panel.

10. The apparatus according to claim 1, wherein the at least one darkening body comprises at least one heating element.

11. The apparatus according to claim 10, wherein the at least one darkening body further comprises at least one photovoltaic panel, and wherein the at least one heating element is coupled to the at least one photovoltaic panel.

12. The apparatus according to claim 10, further comprising:

a weather forecast module that is configured to determine a meteorological forecast based on a plurality of meteorological parameters; and a control unit that is configured to control the at least one heating element based on the meteorological forecast.

13. The apparatus according to claim 12, wherein the weather forecast module comprises a data receiving unit that is configured to receive the meteorological parameters from a network or via broadcast.

14. The apparatus according to claim 12, wherein the weather forecast module comprises a plurality of sensors that are configured to detect the meteorological parameters.

15. The apparatus according to claim 1, wherein the at least one base frame is fixed to the ground.

16. A method of using an apparatus on a ground in a semi-arid, arid or extremely arid region to obtain fresh water by artificially generating a precipitation, wherein the method of using the apparatus comprises:

using at least one darkening body to form a darkening surface having a width and/or a length of at least 3 km and an albedo of less than 0.1, wherein the at least one darkening body comprises only one such darkening body forming the darkening surface or a plurality of such darkening bodies that are arranged side by side to one another and together form the darkening surface;

arranging at least one base frame on the ground to support the at least one darkening body so as to keep the at least one darkening body spaced apart from the ground in order to form a space between the at least one darkening body and the ground; and arranging a precipitation collection system at least partially within the space to collect and store the precipitation falling on the darkening surface, wherein the precipitation collection system comprises at least one water tank and at least one precipitation collection channel that is fluidly connected to the at least one water tank.

17. A method for obtaining fresh water by artificially generating a precipitation, comprising:

providing at least one darkening body;

arranging the at least one darkening body on a ground in a semi-arid, arid or extremely arid region so as to form a darkening surface which has a width and/or a length of at least 3 km and an albedo of less than 0.1, wherein the at least one darkening body comprises only one such darkening body forming the darkening surface or a plurality of such darkening bodies which are arranged side by side to one another and together form the darkening surface;

supporting the at least one darkening body using at least one base frame such that the at least one darkening body is kept spaced apart from the ground in order to form a space between the at least one darkening body and the ground and such that a local heat low is generated that destabilizes air mass above the darkening surface and generates a change in air flow over the darkening surface, which change in air flow leads to a convergence zone above or on a wind-remote side of the darkening surface and, ultimately, to artificial generation of precipitation which falls at least partially on the darkening surface; and collecting and storing the precipitation using a precipitation collection system that is arranged at least partially within the space, wherein the precipitation collection system comprises at least one water tank and at least one precipitation collection channel that is fluidly connected to the at least one water tank.

* * * * *